(12) United States Patent
Thornton et al.

(10) Patent No.: US 7,574,474 B2
(45) Date of Patent: Aug. 11, 2009

(54) SYSTEM AND METHOD FOR SHARING AND CONTROLLING MULTIPLE AUDIO AND VIDEO STREAMS

(75) Inventors: James Douglass Thornton, Redwood City, CA (US); Rebecca Elizabeth Grinter, San Francisco, CA (US); Paul Masami Aoki, Foster City, CA (US); Allison Gyle Woodruff, Foster City, CA (US); Margaret Helen Szymanski, Santa Clara, CA (US)

(73) Assignee: Xerox Corporation, Norwalk, CT (US)

( * ) Notice: Subject to any disclaimer, the term of this patent is extended or adjusted under 35 U.S.C. 154(b) by 1145 days.

(21) Appl. No.: 09/951,726

(22) Filed: Sep. 14, 2001

(65) Prior Publication Data

US 2003/0056220 A1 Mar. 20, 2003

(51) Int. Cl.
*G06F 15/16* (2006.01)
(52) U.S. Cl. .................. 709/205; 709/204; 725/62
(58) Field of Classification Search .......... 709/204, 709/205; 725/62
See application file for complete search history.

(56) References Cited

U.S. PATENT DOCUMENTS

| | | | | |
|---|---|---|---|---|
| 5,944,791 | A * | 8/1999 | Scherpbier ............. | 709/218 |
| 6,411,989 | B1 * | 6/2002 | Anupam et al. ......... | 709/204 |
| 6,560,707 | B2 | 5/2003 | Curtis et al. | |
| 6,769,130 | B1 * | 7/2004 | Getsin et al. ........... | 725/89 |
| 6,772,335 | B2 | 8/2004 | Curtis et al. | |
| 6,988,216 | B2 * | 1/2006 | Lauder ................... | 713/400 |
| 2002/0065065 | A1 * | 5/2002 | Lunsford et al. ........ | 455/411 |
| 2002/0073155 | A1 * | 6/2002 | Anupam et al. ......... | 709/205 |
| 2002/0129106 | A1 * | 9/2002 | Gutfreund .............. | 709/205 |
| 2002/0143859 | A1 * | 10/2002 | Kuki et al. ............. | 709/203 |
| 2002/0152271 | A1 * | 10/2002 | Chafle et al. .......... | 709/204 |
| 2005/0188316 | A1 * | 8/2005 | Ghanamgari et al. .... | 715/743 |
| 2006/0140152 | A1 * | 6/2006 | Wang et al. ........... | 370/331 |
| 2006/0236247 | A1 * | 10/2006 | Morita et al. .......... | 715/733 |

OTHER PUBLICATIONS

Chino et al., "'GazeToTalk': a Nonverbal Interface with Meta-Communication Facility" (Poster Session), Eye Tracking Research & Application, Proceedings of the 2000 Symposium on Eye Tracking Research & Applications, United States, 2000, p. 111.

(Continued)

*Primary Examiner*—Nathan J Flynn
*Assistant Examiner*—Mohamed Wasel
(74) *Attorney, Agent, or Firm*—Patrick J. S. Inouye; Scott E. Smith

(57) ABSTRACT

At least one multimedia presentation is selected by a user of a first device, accessed from a storage source, and presented to the user. Simultaneously, information is transmitted to at least a second device to cause the selected multimedia presentation to be presented by the at least second device without the at least second device receiving input from a second user. Continuous media streams from the first user may be captured and transmitted to the second device. The presenting of the multimedia presentation on the first device is coordinated with the presenting of the multimedia presentation on the second device. The presenting of the captured media streams on the second device is coordinated with the capturing of those streams and the presenting of the multimedia presentation on the second device. Users may individually control the multimedia presentations and the captured media streams.

32 Claims, 4 Drawing Sheets

OTHER PUBLICATIONS

Curtis et al., "The Jupiter Audio/Video Architecture: Secure Multimedia in Network Places," International Multimedia Conference, Proceedings of the Third ACM International Conference on Multimedia, San Francisco, California, United States, pp. 79-90, 1995, ISBN: 0-89791-751-0.

Fish et al., "Evaluating Video as a Technology for Informal Communication," Conference on Human Factors in Computing Systems, Proceedings of the SIGCHI Conference on Human Factors in Computing Systems, Monterey, California, United States, pp. 37-48, 1992, ISBN: 0-89791-513-5.

Nardi et al., "Interaction and Outeraction: Instant Messaging in Action," Computer Supported Cooperative Work, Proceedings of the 2000 ACM Conference on Computer Supported Cooperative Work, Philadelphia, Pennsylvania, United States, pp. 79-88, 2000, ISBN: 1-58113-222-0.

Novak et al., "MMS—Building on the Success of SMS," Ericsson Review No. 3, pp. 102-109, 2001, http://www.ericsson.com/ericsson/corpinfo/publications/review/2001_03/140.shtml.

Sellen A. et al., "The Prevention of Mode Errors Through Sensory Feedback," Human Computer Interaction 7(2), pp. 141-164, 1992.

Singer, Hindus, Stifelman, White, "Tangible Progress: Less is more in Somewire Audio Spaces", SIGCHI 1999, pp. 104-111, ACM.

Kortuem, Bauer, Segall, "NETMAN: The design of a collaborative wearable computer system", Mobile Networks and Applications 4, pp. 49-58, ACM, 1999.

Sawhney and Schmandt, "Nomadic Radio: Speech and Audio Interaction for Contextual Messaging in Nomadic Environments", TOCHI, vol. 7, No. 3, pp. 353-383, ACM, Sep. 2000.

Patterson, Watts-Perotti, and Woods, "Voice Loops as Coordination Aids in Space Shuttle Mission Control", Computer Supported Cooperative Work 8, pp. 353-371, Kluwer Academic Publishers, Netherlands, 1999.

Bly, Sokoler, Nelson, "Quiet Calls: Talking Silently on Mobile Phones", SIGCHI 2001, pp. 174-181, ACM, 2001.

Xerox PARC, "Etherphone: Collected Papers 1987-1988", PARC Technical Report CSL-89-2, May 1989.

Vin, Zellweger, Swinehart, Rangan, "Multimedia Conferencing in the Etherphone Environment", IEEE Computer vol. 24, No. 10, Oct. 1991, IEEE.

* cited by examiner

Terminal

Initialization of Play

Terminal Operation

SYSTEM AND METHOD FOR SHARING AND CONTROLLING MULTIPLE AUDIO AND VIDEO STREAMS

DESCRIPTION OF THE INVENTION

1. Field of the Invention

The present invention generally relates to audio and video communication systems, and more specifically to audio and video systems that enable users with independent terminal devices to share audiovisual content in the context of a communication session, shared software application, or common experience.

2. Description of the Related Art

There are many audio and video communication technologies in existence today. However, these technologies have severe limitations in their ability integrate audiovisual content into synchronous communication among individuals engaged in loosely coordinated activity regardless of physical proximity. Current technologies force users to choose between either hearing and viewing multimedia presentations or conversing with companions via audio and video. Present technologies do not provide users with the ability to integrate multimedia presentations with their conversations to dynamically create a shared experience. For instance, current technologies are unable to support a group of people who would like to view information about paintings in a museum but also want to share the experience with each other and contribute input to the group experience.

The media space is a technology that supports shared audio and, in some cases, audio and video communication. Examples of audio-only media spaces are Somewire and Thunderwire (Singer, Hindus, Stifelman, White, "Tangible Progress: Less is more in Somewire Audio Spaces", SIGCHI 1999, pp. 15-20, ACM). These systems do not support video and do not integrate non-microphone audio elements such as prerecorded music and allow these to be controlled by participants. Media spaces that support both audio and video also do not integrate prerecorded or significant generated audiovisual content and provide very little control to override shared content with personal selections, for example. Moreover, current media space systems lack distributed control: the ability of a particular user to automatically contribute to the audio and video experience of another user(s) without requiring any actions from the other user(s).

There are a variety of other audio and video communication systems available that are also deficient in providing a dynamic, interactive, and content-enriched mechanism for individuals to communicate with. Multimedia Messaging Service (MMS) is the evolution of short message service (SMS), which is a text-based channel available on mobile phones compatible with the Groupe Speciale Mobile (GSM) wireless standard. MMS appears to be a multi-corporation European Standards Telephony Institute (ETSI) initiative to increase the media that can be sent among mobile devices. This system appears to serve as a distribution mechanism rather than as a system for facilitating real-time and dynamic interaction among individuals. MMS does not appear to support services that allow individuals to have continuous audio/video channels available.

Audio and video mixers and multi-track recording systems allow various elements of audio and video to be dynamically combined; however, these systems are not symmetric, support only a broadcast form of communication, and lack distributed control. Wearable computer systems such as NETMAN (Kortuem, Bauer, Segall, "NETMAN: The design of a collaborative wearable computer system", Mobile Networks and Applications 4, pp. 49-58, ACM, 1999) provide wireless communication. However, these systems are limited to live participant voices and do not support distributed control. The Nomadic Radio system (Sawhney and Schmandt, "Nomadic Radio: Speech and Audio Interaction for Contextual Messaging in Nomadic Environments", TOCHI, vol 7, no. 3, ACM, September 2000) dynamically mixes a variety of audio elements in sophisticated ways providing direct control for the user. However, this system serves as an interface for a single user to access various message streams and thus does not support synchronous audio and video communication between multiple parties.

Voice Loops (Patterson, Watts-Perotti and Woods, "Voice Loops as Coordination Aids in Space Shuttle Mission Control", Computer Supported Cooperative Work 8, pp. 353-371, Kluwer Academic Publishers, Netherlands, 1999) and similar intercom/radio type systems provide support for multiple channels and allow for an audio conversation. However, they do not integrate audiovisual content into the conversation or support a shared application.

The Quiet Calls system (Bly, Sokoler, Nelson, "Quiet Calls: Talking Silently on Mobile Phones", SIGCHI 2001, pp. 174-187, ACM, 2001) involves using wireless handheld terminals (e.g. cell phones). A user is able to interact with Quiet Calls through a user interface on the terminal in order to trigger pre-recorded audio clips to be played for a receiving user to hear. In this case, however, the system is designed to play recordings of the device owner's own voice in order to manage communication with a caller in a situation that inhibits the owner from speaking (e.g. in a meeting). Further, there is no integration of audio into a synchronous conversation, there is no shared application, and the caller does not have any control other than to hang up. In particular, the caller is not able to make selections for the owner to hear. The audio recordings are also not mutually informative as the owner is using them to send messages to the caller, not to gain any information for himself/herself.

Multiplayer, interactive computer games are a related technology that allow users to interact with a distributed shared application (the game itself). Each user has his/her own terminal (a PC) and uses the user interface of their respective device to interact with the game. All players contribute by their inputs to the state and output of the game. These games typically use audio extensively to provide sound effects that convey significant information by indicating, for example, the proximity of another player. Some games, and companion programs like TeamSound, have added inter-player communication features like real-time voice conferencing, the ability to trigger playing of audio recordings for all players in a group, and even the ability to send text messages that are turned into audio by voice synthesis. However, the games are designed for terminals with large screens and sophisticated 3D graphics providing an immersive experience in a virtual environment and thus the communication and sharing features are not designed for portable wireless devices. Moreover, the games do not incorporate video among the multimedia content that can be shared. Although symmetric, the user selected audio recordings to play is done as in Quiet Calls simply as a rapid form of message communication, not as a way to gain information that can be shared with others and those user selected audio presentations are never mutually informative: where all parties involved learn or experience something they previously were unaware of. The game systems also do not offer control features that, for instance, allow one player to hear a presentation they select overriding just for themselves what anyone else has selected.

The Etherphone system, another related work created by Xerox PARC, is described in "Etherphone: Collected Papers 1987-1988", PARC Technical Report CSL-89-2, May 1989. This is a system for enhancing telephone service using computer networks and servers and computer workstations for richer user interfaces. An Etherphone terminal incorporates a conventional telephone set, along with speaker, microphone, and computer workstation (shared with other functions). Etherphone contemplates a wide variety of features including the ability to add voice annotations to documents or otherwise use audio in computer applications, controlling call handling with the ability to select a person to call from a list on the screen, automatic forwarding, custom ring tones, and the ability to carry on a voice conversation while interacting with shared collaborative applications. One of the features, Background Calls, allows parties to share a long term voice communication session which could be superceded by other short term calls. Etherphone publications also speak of access to television and radio broadcasts and shared recorded audio files through the system. However, Etherphone features are linked to an office setting with computer workstations and wired telephones and do not address the mobile wireless context. The Etherphone system also does not include shared applications providing mutually informative audio or video. Moreover, Etherphone does not provide a mixture of sharing and independent control.

There are various collaborative work tools like those available to use alongside Etherphone, and remote teleconference tools like Microsoft's NetMeeting that support sharing regular applications on a computer. However, these tools do not incorporate shared applications using mutually informative audio, sharing and independent control, nor portable wireless service.

Another set of related systems are instant messaging and chat systems. However, these systems do not integrate audiovisual content into conversations, nor offer the control features which allow sharing and independent control.

There are games for mobile phones, in which users have mobile wireless terminals and each provide inputs that result in the playing of game sounds on other devices. The game forms a shared application between the players; however, these games do not provide synchronous voice or video communication between the players through the device and do not include a mutually informative shared application.

Current audio and video technologies do not provide users with the ability to dynamically integrate informative multimedia presentations with conversations to create a shared experience. Further, current systems do not allow users to automatically experience what other users are viewing or hearing, regardless of physical proximity and without requiring user input, while also allowing for individual preferences and control.

SUMMARY OF THE INVENTION

Systems, methods, apparatuses, and computer readable mediums consistent with the present invention allow a user of a first device to select at least one multimedia presentation by inputting selection data. Based on this selection, the multimedia presentation is accessed from a storage source and presented to the first user. Simultaneously, information is transmitted to at least a second wireless portable device that causes the selected multimedia presentation to be presented by the at least second device without the at least second device receiving input from a second user. Continuous media streams from the first user may be captured and transmitted to the at least second device, wherein these media streams are presented on the at least second device without the at least second device receiving input from the second user. The presenting of the multimedia presentation on the first device are coordinated with the presenting of the multimedia presentation on the ax at least second device; and the presenting of the captured media streams on the at least second device are coordinated with the capturing of those streams by the first device and the presenting of the multimedia presentation on the at least second device. Further, users may control the content and transmission of the multimedia presentation and the captured media streams.

In one embodiment, a method for presenting audiovisual data streams on a first device includes allowing a first user of the first device to select at least one audiovisual data stream stored in a memory residing in the first device; accessing a plurality of other audiovisual data streams selected by at least a second user of at least a second device from the memory of the first device in response to access data received by the first device from said second device; simultaneously presenting on the first device the audiovisual data streams selected by the first user and the audiovisual data streams selected by the at least second user; and distinguishing on the first device each of the audiovisual data streams selected by the first user and each of the plurality of audiovisual data streams selected by the at least second user, wherein accessing the plurality of audiovisual data streams selected by the at least second user is performed automatically by the first device and without input from the first user to the first device.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

DETAILED DESCRIPTION

Figure 1:
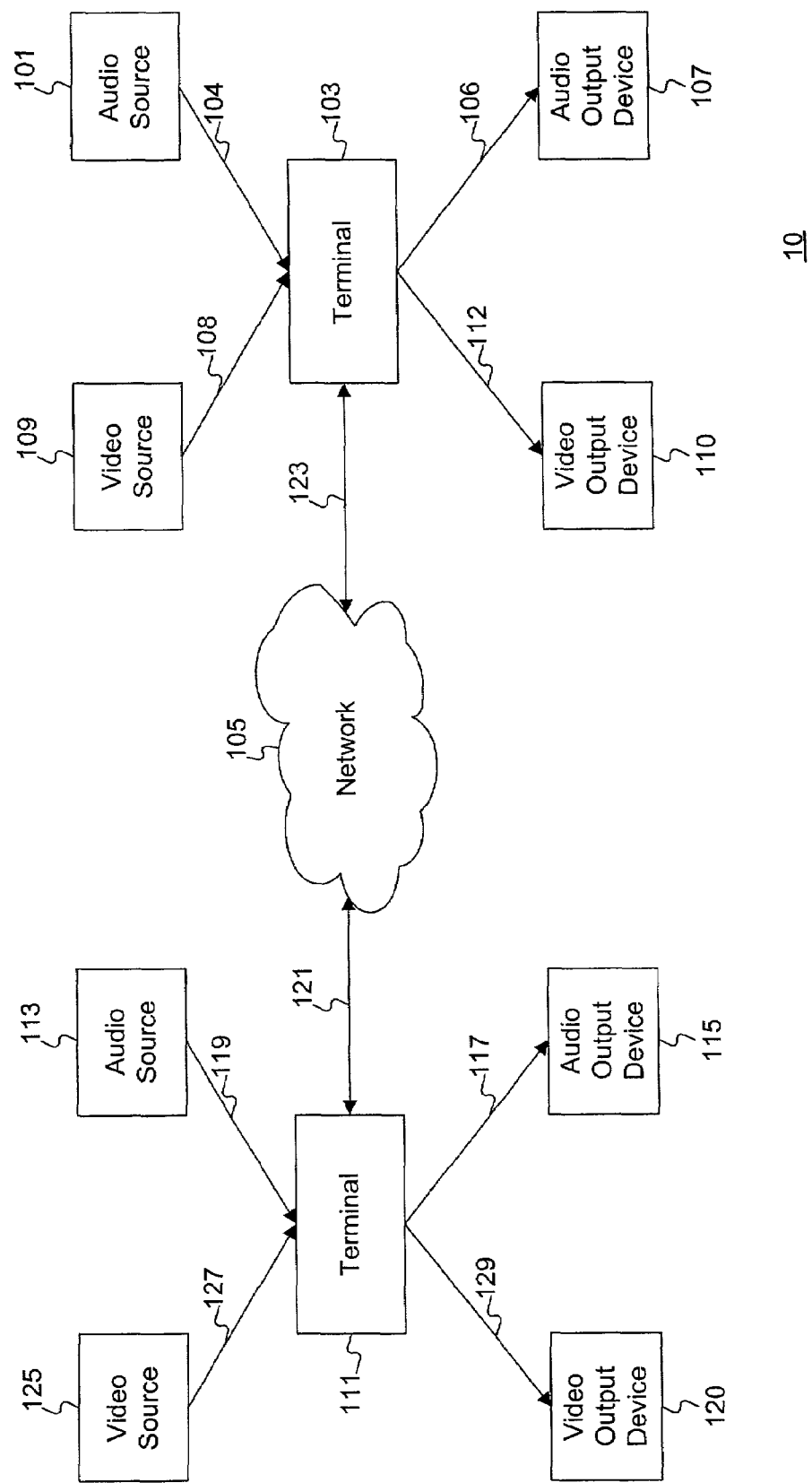
FIG. 1 is a network diagram of a network in which systems and methods consistent with the present invention may be implemented.

In the following detailed description reference will be made to the accompanying drawings in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of present invention. The following detailed description is, therefore, not to be taken in a limited sense.

Systems, methods, and devices consistent with the present invention enhance conventional synchronous communication between people by integrating audiovisual content into natural conversation through coordination of such content with the activity of the individuals, especially related to a shared application or task. In one embodiment of the present invention, a system may comprise two or more terminals coupled to a network, where each device may comprise audio and video inputs and outputs; a memory including an interactive program, a control facility, and audiovisual content; a user interface for allowing the users to access the control facility and interactive program; and a processor for executing the programs. The terminals allow users to coordinate, communicate, and control audiovisual content stored in memory and audio and video data streams received from users. Coordination will refer, hereinafter, to audiovisual content being automatically shared and presented among participants while allowing the precise timing and form of the presentation to be adjusted in accordance with individual preferences and actions. For example, when two participants are using a shared application that provides information about an art exhibit, coordination may include each person automatically and simultaneously seeing and hearing the selected audiovisual content about the exhibit, while each participant retains individual priority: if both participants choose different selections at the same time (users' action), each individual will hear only their own selection in response. The present invention supports a shared experience and distributed control, since no action is required for one party to hear and see what other parties are experiencing. Moreover, individual independence is preserved through independent user control over the presentation of the audiovisual content. The combination of integrated sharing with independent user control supports extensive audiovisual conversation among participants, and facilitates the inclusion of audiovisual content into informal person-to-person communication.

One implementation of the present invention may involve a group of people visiting an art museum that provides audio and/or video commentary on exhibits through a shared application accessible by or residing on wireless devices. In this scenario, the group members have the ability to communicate with each other using audio and/or video while simultaneously listening to the audiovisual descriptions and viewing the exhibits. Each participant may hear, through their respective device, descriptions played by other members of the group without having to input any commands to their respective devices. Thus, each member of the group may be aware of the focus of other member's attention and have the ability discuss descriptions that have been experienced. The present invention provides the above-mentioned functionality regardless of the physical location of the group members.

Another implementation of the present invention may include a multimedia history encyclopedia integrated with a shared voice conference mechanism to a group of students each using a home computer. Each student may be able to select various audiovisual entries in the encyclopedia, such as recordings of voice actors reading historic speeches or video segments of battlefield reenactments. Moreover, each student's selection may be automatically played for all the others. In this embodiment, each student is provided with individual control features as well. These controls may include the ability for each person to turn off content from selected others, allowing the group to divide into a number of sub-groups.

It should be understood that the foregoing implementations are exemplary and should not be construed in a limiting sense. One skilled in the art will appreciate that the present invention will have a variety of implementations not limited to those previously described.

Referring now to the drawings, in which like numerals represent like elements throughout the figures, the present invention will be described.

FIG. 1 is an overview of system 10 that enables users to dynamically control and exchange multiple audio and/or video channels simultaneously in accordance the principles of the present invention. In one embodiment, the system 10 of FIG. 1 comprises at least a first user terminal 103 and a second terminal 111 coupled together via network 105. While FIG. 1 shows network 105 as comprising two user terminals, one skilled in the art will understand that network 105 may consist of any number of geographically dispersed user terminals. One skilled in the art will also understand that network 105 may be the Internet or other computer network such an intranet, or other similar network that allows multiple user terminals to transmit and receive multiple data streams. User terminals 103 and 111 are operatively connected to network 105 by communication devices and software known in the art, such as an Internet Service Provider (ISP) or an Internet gateway.

In one embodiment, terminals 103 and 111 are portable hand-held wireless devices that provide computing and information storage and retrieval capabilities to users. As shown in FIG. 1, terminals 103 and 111 may be connected to one or more audio sources 101 and 113, and video sources 109 and 125. These sources provide audio and video data streams, respectively to terminal 103 and 111 via connections 104, 108, 119, and 127. Audio sources 101 and 113 may include general microphones, personal microphones including conventional and unconventional audio transfer (e.g. bone conduction), and line inputs from other electronic audio equipment. Video sources 109 and 125 may include cameras, video recorders or any other image capture devices, or line inputs from other electronic video equipment. The audio and video sources may also be data streams originating outside the system, such as pre-recorded television and live radio broadcast signals.

Terminals 103 and 111 are also connected to audio output devices 107 and 115, and video output devices 110 and 120. Audio output devices may include, but are not limited to audio speakers, headphones, and unconventional audio transfer. Video output devices 110 and 120 may include televisions, video recording devices, or any other electronic video equipment. For the sake of brevity, each terminal in FIG. 1 is shown to be connected to a single audio and video source and output. However, the terminals may be connected to several different sources and outputs without departing from the scope of the present invention. Moreover, the terminals may be connected to an audio source(s) only or a video source(s) only. Further, the audio and video sources and output devices may be external (shown in FIG. 1) or internal to the terminals. For instance, an LCD display or an internal speaker on the device.

Figure 2:
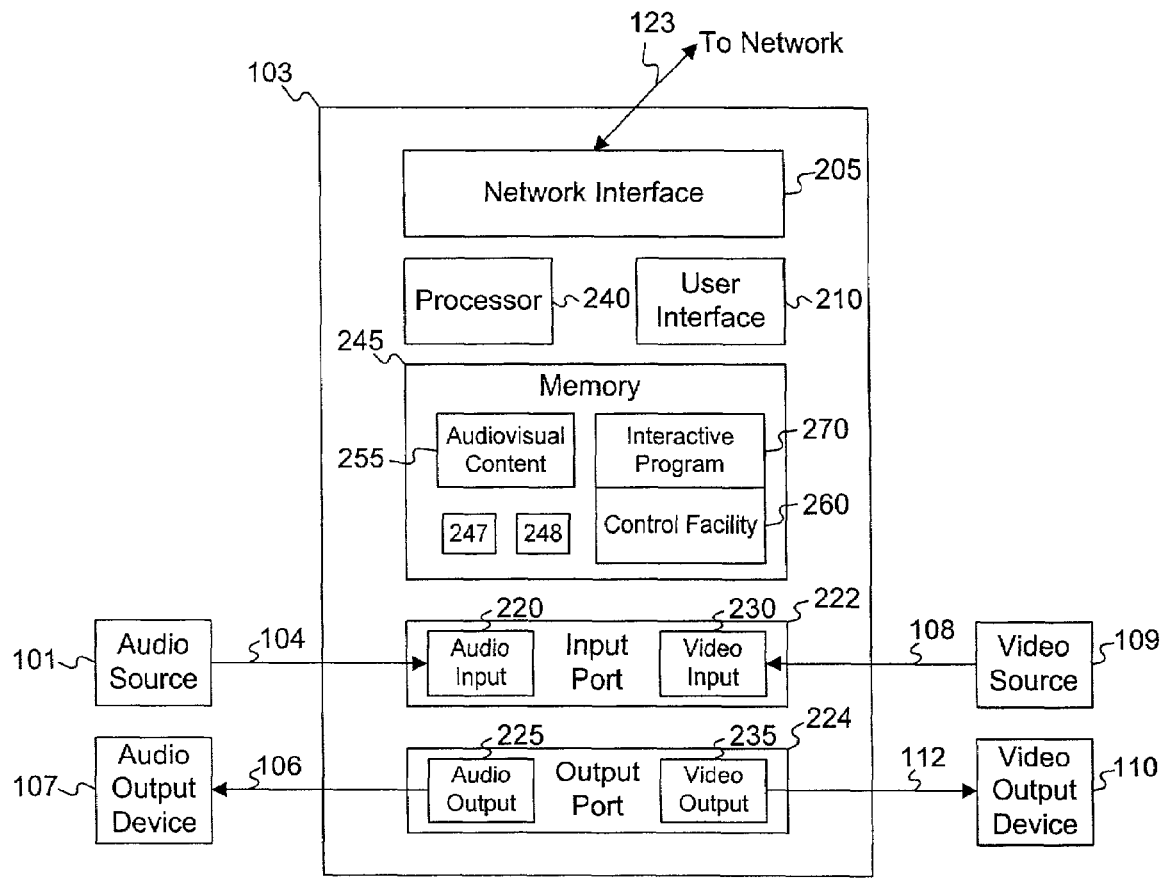
FIG. 2 is a detailed block diagram representative of a device depicted in the network of FIG. 1.

Referring now to FIG. 2, it is shown that each user terminal (103 and 111) is comprised of a network interface 205, user interface 210, data input port 222, data output port 224, processor 240, and memory 245. Data input port 222 may further comprise an audio input port 220 and a video input port 230. Data output port 224 may further comprise an audio output port 225 and video output port 235. The terminal includes connectors 104, 106, 108, and 112 for connecting audio and video sources 101, 107, 109, and 110 to audio input 220, audio output 225, video input 230, and video output 235, respectively. Memory 245 may include static RAM and may further comprise an audio disk 247 and a video disk 248. Memory 245 further comprises audiovisual content 255, control facility 260 and a set of instructions collectively referred to as interactive program 270.

Interactive program 270 is run on processor 240 and controls the audiovisual content 255 residing in memory 245. Audiovisual content 255 may include, but is not limited to multimedia presentations created to inform users about their surroundings (e.g. art exhibits). Interactive program 270 is responsible for the coordination of the audiovisual content 255. Interactive program 270 may also synchronize audio and video data streams received from audio source 101 and video source 109 with the audiovisual content 255 stored in memory. Interactive program 270 may be implemented in software that resides in memory 245 (as shown) or embedded on processor 240.

Control facility 260 interacts with interactive program 270 and provides users with the ability to modify and mix the audio and video data streams received from audio source 101 and video source 109 and the audiovisual content in order to create an output data stream to send to another terminal via network interface 205. Mixing may include, but is not limited to, spatial variation, loudness variation, and effect variation. Spatial variation may involve arranging audio streams in such a way as to create a simulated sound field for the user. Effect variation may involve adding reverb, delay, echo, gating and other effects to audio and altering the hue of a visual display. In one embodiment, these mixing techniques are performed by the sending terminal. However, in another embodiment, these mixing techniques may be performed by the receiving terminal. Control facility 260 provides users with the ability to establish a communication session: to select which terminal to share audiovisual content 255 and audio and video data streams received from audio source 101 and video source 109 with. This may also involve subdividing further into subsessions. Control facility 260 also provides dynamic control over the transmission of the output data stream to the selected terminals. This control may include, but is not limited to: adding additional users to a session, removing users from a session, controlling the volume levels, and selecting specific portions of the audiovisual content 255 to transmit. For instance, a user may wish to send one part of a particular image scene (e.g., a single flower from an image of a bouquet of flowers), which can be specified using the controls. Control facility 260 also allows a 11 user to decline and consent to output data streams produced by other users and received via network interface 205. Control may include, but is not limited to, outright accepting, outright refusing, receiving portions, and specifying specific users to refuse or accept channels from. Users can establish access policies prior to receiving the channels or may refuse and accept channels subsequent to their arrival. Additionally, control facility 260 allows a user to customize the presentation (on audio output 107 and video output 110) of the audiovisual content 255 stored in memory 245 and output data streams produced by other terminals and received via network interface 205. Control facility 260 may be executed on processor 240 and may be implemented in software that resides in memory 245 (as shown) or embedded on processor 240.

The foregoing descriptions of control facility 260 and interactive program 270 are exemplary only. The specific functions provided by each of these functional blocks may be interchangeable. Further, in another embodiment, these functional blocks may be combined into a single block. Moreover, interactive program 270 and audiovisual content 255 may reside on a server remotely located with respect to the user terminal. Additionally, the functions of control facility 260 and interactive program 270 may be automatically provided to the terminal without user input.

Users may access control facility 260 and interactive program 270 and issue specific control commands, which control facility 260 and interactive program 270 provide, via user interface 210. User interface 210 may be an input port connected by a wired, optical, or a wireless connection for electromagnetic transmissions, or alternatively may be transferable storage media, such as floppy disks, magnetic tapes, compact disks, or other storage media including the input data from the user. User interface 210 may also include at least one button actuated by the user to input commands to select from a plurality of operating modes to operate processor 240. In alternative embodiments, user interface 210 may include a keyboard, a mouse, a touch screen, and/or a data reading device such as a disk drive for receiving the input data from input data files stored in storage media such as a floppy disk or other storage tape. User interface 210 may alternatively include connections to other computer systems to receive the input commands and data therefrom. Processor 240 is operatively configured to receive input commands and data from a user associated with the user terminal though user interface 210.

Terminal 103, as shown in FIG. 2, is connected to network 105 via network interface 205, which is operatively connected via a wired and wireless communications link. Network interface 205 may be a network interface card, unit, or any other type of dedicated network connection. In operation, network interface 205 may be used to send data to and receive data from other terminals.

Figure 3:
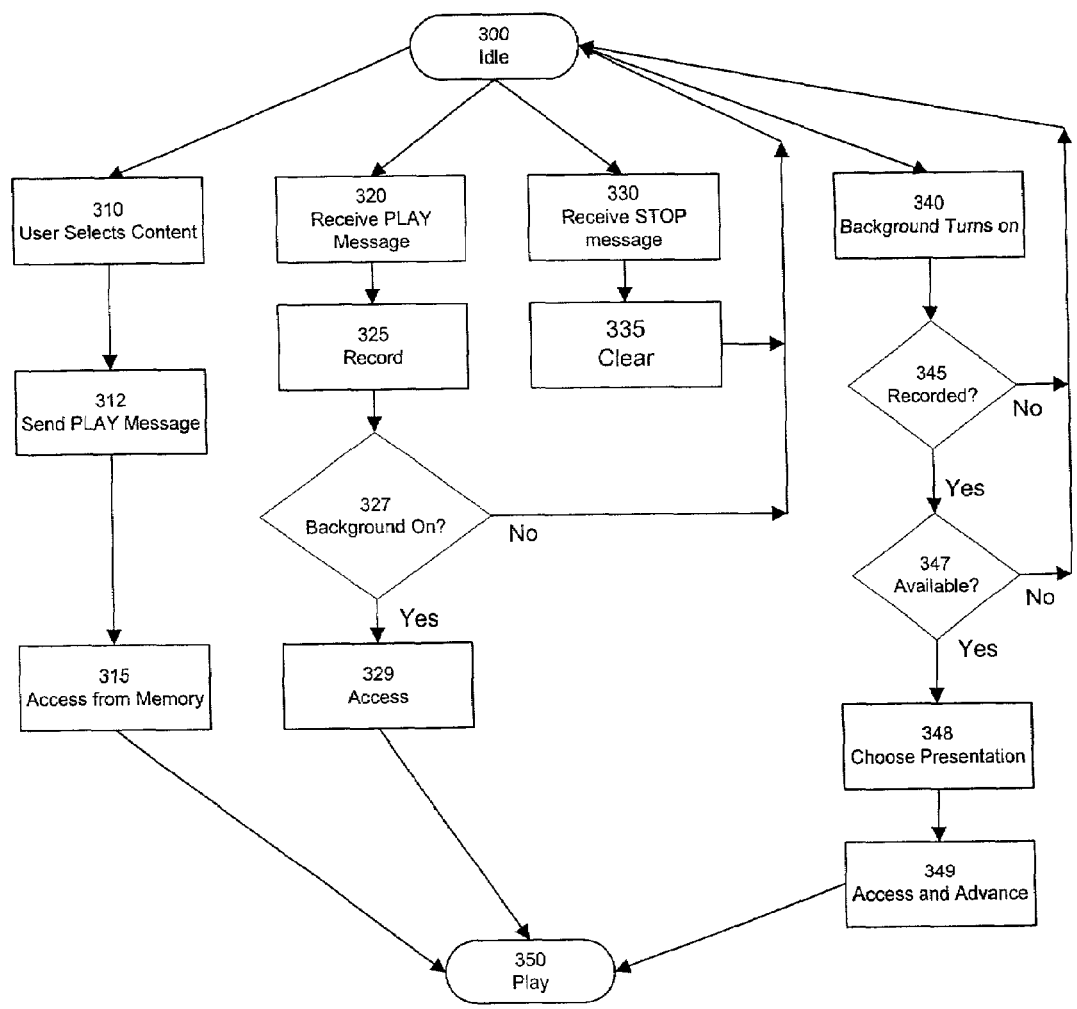
FIG. 3 is a flow chart depicting the initialization of presentations on a device consistent with principles of the present invention.

Referring now to FIG. 3, a detailed flowchart depicting the initialization of play on a terminal will be described. It should be understood that in operation the particular order of events may vary from this description without departing from the scope of the present invention.

In operation, a communication session is established between terminal 103 and any number of additional like terminals via control facility 260. The session may be established, for example, by entering network ID's into each terminal for identifying members. Once a session is established, the audio and video streams received from audio source 101 and video source 109 are transmitted via network interface 205 to the other terminals in the session. Each terminal in the session receives these data streams, controls them by way of their respective control facilities, and presents them to the respective users. This session establishment and person-to-person audio and video data communication takes place in the idle state, indicated by step 300. This step may also involve applying various compression and feedback reduction techniques, by way of control facility 260. In one embodiment, informative multimedia presentations (e.g. audiovisual content 255) are stored locally in the respective memories of each terminal and accessible by each of the respective users. A multimedia presentation stored in memory 245 selected by a user of terminal 103 for playing on terminal 103 will hereinafter be referred to as a foreground presentation. Whereas, a presentation selected and triggered by another session member for play on terminal 103 will hereinafter be referred to as a background presentation. A user is able to control both the background and foreground presentations by way of control facility 260 via user interface 210. Control may include, but is not limited to: volume level control and turning specific background presentations on and off. Further, interactive program 270 and control facility 270 may add audio and video effects to the presentations. As indicated in step 310, a user may select a locally stored foreground presentation for playing. Selecting may include, but is not limited to tapping an object in an image presented via user interface 210. In another embodiment, a foreground selection may occur automatically by way of a user's physical proximity to a particular object in the environment. As indicated in step 312, the selection of a foreground presentation causes a corresponding PLAY message to be transmitted to all of the session members indicating the time at which the play started, the particular presentation being played, and the source terminal identifier. As indicated in step 315, the selection triggers the access of the selected presentation from memory 245. Step 350 indicates that the selected and accessed foreground presentation is being presented to the user. The presenting (or playing) of presentations may be performed via audio and video output devices residing internally or externally with respect to terminal 103. In one embodiment, the playing of a presentation may also be performed in part or fully by a display mechanism resident in the user interface. Conversely, when terminal 103 receives a PLAY message from another sending terminal, as indicated in step 320, terminal 103 records it in a portion of memory 245 previously designated for that sending device, as specified in step 325. As indicated in step 327, terminal 103 then determines, based on the user's control settings and terminal state, whether to play the presentation. If the background has not been disabled by the user, the background presentation selected by the sending user will be accessed by terminal 103 (step 329) and immediately played on terminal 103 (step 350), thereby allowing the users to experience the presentation simultaneously. In this embodiment, all presentations are locally stored and, therefore, a background presentation is accessed by terminal 103 via interactive program 270 using pointers or file names received from the sending device(s) through network interface 205. If at step 327 it is determined that the background presentation cannot be played on terminal 103 immediately, terminal 103 returns to the idle state (step 300). However, if the background is enabled by the user at a later time (step 340) and the background presentation was previously recorded in memory (step 345) and available (step 347), interactive program 270 will access the background presentation from memory 245 and seek forward the amount of time elapsed since the play of the background presentation commenced and will begin play of the background presentation on terminal 103 from that point (steps 349 and 350), thereby allowing the users to experience the presentation simultaneously even though the user of terminal 103 experiences only a portion of the presentation. Step 349 may also include allowing the user to input control settings for controlling the background presentation. If more than one background presentation was previously sent to terminal 103, then interactive program, in one embodiment, chooses one presentation to access and play, as indicated in step 348. This choosing may be controlled by preset algorithms resident in interactive program 270 and may include cueing the presentations in a particular order.

For the sake of brevity, the foregoing description of FIG. 3 assumes that terminal 103 is plays either a foreground presentation or a background presentation at step 350. However, in another embodiment, multiple foreground and/or background presentations are played simultaneously. For example, terminal 103 could receive multiple PLAY messages from more than one sending terminal corresponding to several different background presentations, or a user may select more than one foreground presentation for simultaneous play. In such cases, interactive program may distinguish the various presentations on terminal 103 by way of effect, spatial, and loudness variation. For audio, distinguishing may involve adding effects including reverb, delay, gating, and echo. Distinguishing may also involve spatial positioning to create a multidimensional sound field, pitch shifting, bandpass filtering, treble and bass boosts and cuts, and adding distinctive sounds in the background. For video, distinguishing may involve color shifting: black and white, sepia tone, varying saturations, size variation, filtering, cropping, and adding and superimposing distinctive images. In one embodiment, the effects processing is done in advance and each device contains multiple versions of a presentation in their respective memories. In another embodiment, the effects processing is done by the respective processors as the audiovisual content is being played.

Figure 4:
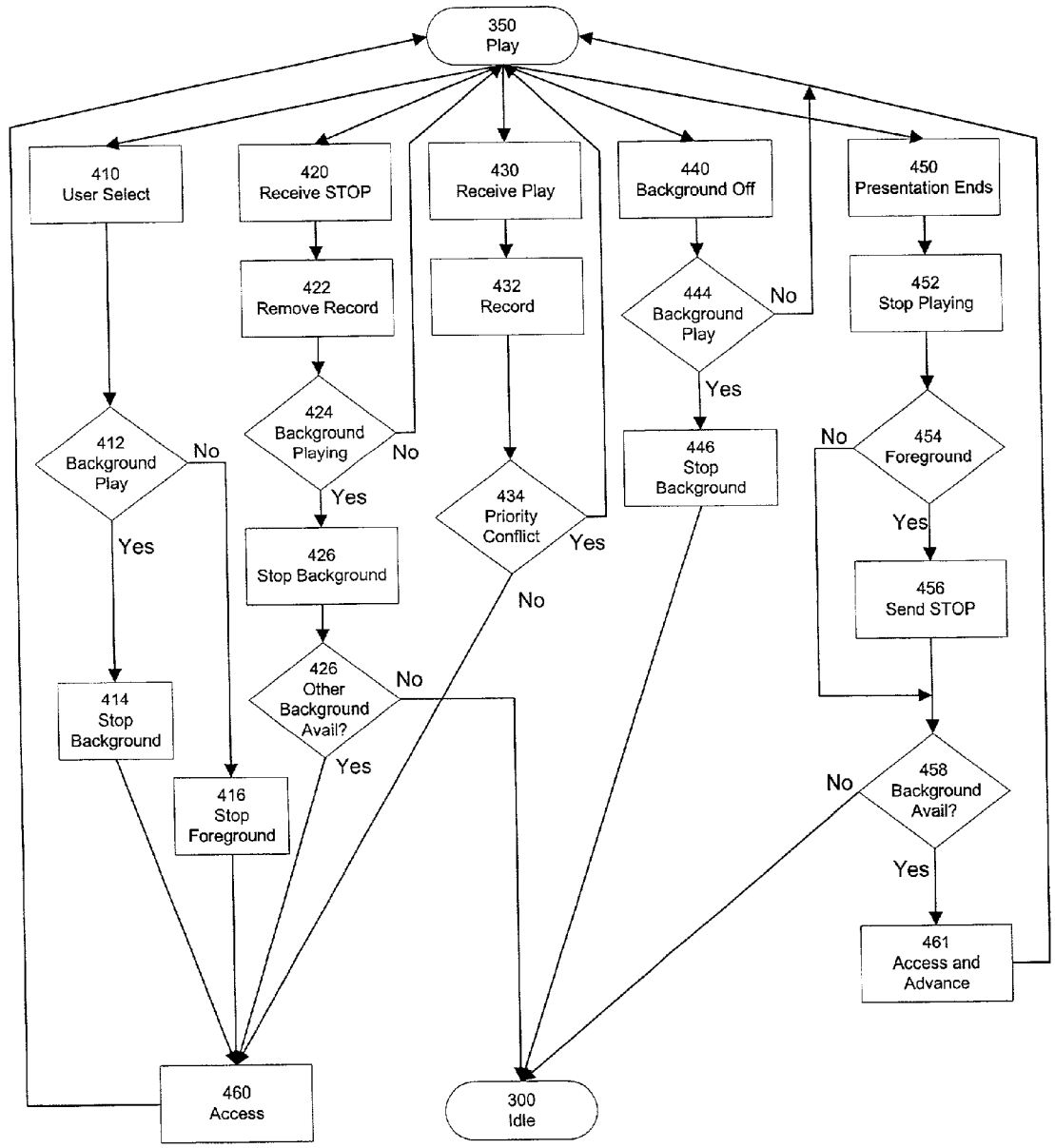
FIG. 4 is a flow chart depicting device operation subsequent to the initialization of play consistent with principles of the present invention.

Referring now to FIG. 4, a detailed flowchart depicting terminal operation subsequent to the initialization of a foreground or background presentation will be described. It should be understood that in operation the particular order of events may vary from this description without departing from the scope of the present invention.

As previously indicated, step 350 may involve playing either a foreground or background presentation or, in another embodiment, some combination thereof. If the user of terminal 103 selects a foreground presentation (step 410) after terminal 103 has left the idle state (i.e. a previously chosen or received presentation is being played), interactive program 270 may perform a priority conflict check (step 412). In one embodiment, foreground presentations have priority over background presentations. Therefore, if it is determined at step 412 that a background presentation is currently being played, then interactive program 270 will halt play of that presentation, access the foreground presentation from memory 245, and play the accessed foreground presentation. If there is no priority conflict, the foreground presentation will be accessed and played immediately. If terminal 103 receives a STOP message (step 420), the corresponding record will be removed from memory, as indicated by step 422. If the background presentation corresponding to the STOP message is playing (step 424), interactive program will halt its play, as indicated in step 426. Interactive program will then search for any other background presentation available for play, whether cued or otherwise (step 428). If another background presentation is found, interactive program will access and seek forward the amount of time elapsed since the play of that background presentation commenced and will begin play of the background presentation on terminal 103 from that point (step 461). However, if no other background presentations are to be played, terminal 103 will return to idle (step 300). Step 430 indicates another PLAY message being received by terminal 103. As explained in connection with FIG. 3, the message will be recorded in memory 245, as indicated in step 432. However, at this point a priority check is performed (step 434) to ensure that a foreground presentation is not currently playing. If there is no conflict, the background presentation corresponding to the PLAY message will be accessed and played. However, if there is a priority conflict, the foreground will continue to be played and the background will be handled by interactive software 270. In one embodiment, the background presentation may be placed in a cue. Step 440 indicates that a user of terminal 103 has disabled the background on the terminal. This will cause interactive program 270 to check if there is a background presentation playing, as specified in step 444. If there is no background presentation playing and there is a foreground presentation being played, the terminal will return to step 350 and continue playing the foreground presentation. However, if a background presentation is being played, it will be halted (step 446) and terminal 103 will return to the idle state (step 300). Step 450 indicates that either a background or foreground presentation has ended. In response, terminal 103 will stop playing (step 452). If there was a foreground presentation playing, terminal 103 will transmit a corresponding STOP message to all other session members, as indicated in step 456. If there was a background presentation playing, interactive program will search for other background presentations to be played as indicated in step 458. If another background presentation is found, interactive program will access and seek forward the amount of time elapsed since the play of the background presentation commenced and will begin play of the background presentation on terminal 103 from that point, as indicated in step 461.

For the sake of brevity, the foregoing description of FIG. 4 assumes that only one background presentation is played at a time and that foreground presentations take priority over background presentations. However, those skilled in the art will appreciate that terminal 103 can be configured to mix and display a plurality of background and foreground presentations simultaneously, and to audibly or visually differentiate the various presentations for the user. Moreover, in another embodiment, it may prove advantageous to give background presentations priority over foreground presentations. It should also be understood that person-to-person communication is not confined to the idle state. The present invention integrates person-to-person conversations with the playing of multimedia presentations. Thus, none of the above-mentioned steps preclude users from simultaneously conversing with each other via audio and video streams.

In operation, control facility 260 and interactive program 270 may provide users with different modes of synchronization including: peek and slave. Peeking is a temporally short length of time when a user is able see and hear what another user is viewing or listening to. Slaving is a temporally long length of time when a user is able to connect to another device and present what that user's terminal is presenting. The terminal remains slaved until the user issues a cancel command through user interface 210.

In operation, each terminal may be adapted to engage in push and pull modes of sharing. Pull sharing involves the sender asking for audiovisual content, while push focuses on sending and displaying audiovisual content to another device. This push and pull model allows users to share information with each other and also attract another users' attention.

The controls, inputs and other constraints that determine the interactions between a sending and receiving terminal may be referred to as the profile of a particular communication session. In accordance with one aspect of the present invention, each user participates in one communication session per terminal. In another embodiment, a user may be able to participate in multiple sessions using a single terminal. A session profile may also be dynamic: it may be composed of many sub-profiles and the composition may change over time as a result of the actions of the participants and the environment.

It should be understood that programs, methods etc. described herein are not inherently related to any particular computer or other apparatus, and may be implemented by a suitable combination of hardware, software and/or firmware. Further, various types of general purpose machines may be used with programs constructed in accordance with the teachings described herein. Similarly, it may be advantageous to construct specialized apparatuses to perform the method steps described herein.

It will be apparent to those skilled in the art that various modifications and variations can be made in the systems, methods and devices of the present invention and in the construction of this invention without departing from the scope of or spirit of the invention. For example, the control facility and interactive program may be integrated into one collective software package. Further, the functions provided by the control facility and interactive program may be interchangeable and may be provided without user inputs. Moreover, the interactive program may reside at a remote location rather than being distributed among each user terminal. Additionally, data may be transmitted and received between terminals directly rather than via a network.

The present invention has been described in relation to a particular embodiment which is intended in all respects to be illustrative rather than restrictive. Those skilled in the art will appreciate that many different combinations of hardware, software, and/or firmware will be suitable for practicing the present invention.

Moreover, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for communicating amongst a plurality of user terminals, the method comprising:

selecting at least one multimedia presentation on a first user terminal by a first user;

transmitting information corresponding to the at least one multimedia presentation to at least a second user terminal of the plurality of user terminals;

capturing continuous media streams from the first user and transmitting the media streams to the at least second user terminal;

receiving information by the first terminal corresponding to at least one other multimedia presentation from the at least second user terminal;

receiving captured continuous media streams by the first terminal from the at least second user terminal;

coordinating presentation of the at least one multimedia presentation on the first user terminal with presentation of the at least one multimedia presentation on the at least second user terminal;

coordinating presentation of the captured media streams on the at least second user terminal with the capturing of said streams by the first user terminal and presentation of the at least one multimedia presentation on the at least second user terminal;

dynamically controlling the priority of the presentation of the at least one multimedia presentation and the at least one other multimedia presentation on the first user terminal based on a profile of the first user terminal;

dynamically controlling the priority of the presentation of the at least one multimedia presentation and the at least one other multimedia presentation on the second user terminal based on a profile of the second user terminal; and displaying the at least one multimedia presentation or the at least one other multimedia presentation on the first user terminal and the second user terminal based on the respective profile.

2. The method of claim 1, wherein transmitting information to the at least second user terminal includes transmitting the at least one multimedia presentation selected by the first user.

3. The method of claim 1, wherein transmitting information to the at least second user terminal further comprises transmitting access data that allows the at least second user terminal to access the at least one multimedia presentation selected by the first user from a storage source.

4. The method of claim 1, wherein coordinating the presentation of the at least one multimedia presentation by the first user terminal with the presentation of the at least one multimedia presentation on the at least second user terminal further comprises at least one of presenting the at least one multimedia presentation on the first and second user terminals simultaneously, presenting the at least one multimedia presentation on the at least second user terminal at the earliest time after presenting the at least one multimedia presentation on the first user terminal when the at least second user terminal is not busy, and presenting the at least one multimedia presentation on the at least second user terminal at a pre-calculated time.

5. The method of claim 1, wherein coordinating the presentation of the captured media streams on the at least second user terminal with the capturing of said streams by the first user terminal and the presentation of the at least one multimedia presentation on the at least second user terminal further comprises at least one of presenting the captured media streams on the at least second user terminal immediately, in the same time relation to the presenting of the at least one multimedia presentation on the first user terminal, and a calculated combination thereof.

6. The method of claim 1, wherein selecting the at least one multimedia presentation further comprises accessing the at least one multimedia presentation from a memory user terminal residing internally with respect to the first user terminal.

7. The method of claim 1, wherein selecting the at least one multimedia presentation further comprises accessing the at least one multimedia presentation from an external storage medium coupled to the first user terminal.

8. The method of claim 1, wherein selecting the at least one multimedia presentation further comprises accessing the at least one multimedia presentation from an external source accessible via a wireless communication link.

9. The method of claim 1, wherein coordinating further comprises mixing the at least one multimedia presentation and the captured media streams.

10. The method of claim 1, wherein dynamically controlling further comprises inhibiting the at least second user terminal from receiving the at least one multimedia presentation.

11. The method of claim 1, wherein dynamically controlling further comprises selecting portions of the at least one multimedia presentation to transmit to the at least second user terminal.

12. The method of claim 1, wherein capturing continuous media streams further comprises capturing voice signals from the user.

13. The method of claim 1, wherein capturing continuous media streams further comprises capturing video signals from an environment.

14. The method of claim 1, wherein the first and second user terminals are wireless devices.

15. A system for communicating amongst a plurality of user terminals, comprising:
 a first user terminal, comprising:
  a communication interface adapted to transmit data to at least a second user terminal of a plurality of user terminals and receive data from the at least second user terminal;
  a memory including a program and at least one multimedia presentation;
  a processor that runs the program; and
  a user interface for allowing the first user to input commands to the program, wherein the program:
   allows the first user to select the at least one multimedia presentation;
   transmits information corresponding to the at least one multimedia presentation to the at least second user terminal via the wireless communication interface;
   transmits audio and video signals from respective audio and video capture user terminals as continuous media streams to the at least second user terminal via the communication interface;
   receives information corresponding to at least one other multimedia presentation from the at least second user terminal;
   receives captured continuous media streams from the at least second user terminal;
   coordinates presentation of the at least one multimedia presentation on the first user terminal with presentation of the at least one multimedia presentation on the at least second user terminal;
   coordinates presentation of the captured continuous media streams on the at least second user terminal with the capturing of said continuous media streams by the first user terminal and presentation of the at least one multimedia presentation on the at least second user terminal;
   dynamically controls the priority of the presentation of the at least one multimedia presentation and the at least one other multimedia presentation on the first user terminal based on a profile of the first user terminal; and
   displays the at least one multimedia presentation or the at least one other multimedia presentation on the first user terminal based on the profile of the first user terminal via means for displaying still and moving pictures and means for producing sound,
 wherein the at least second user terminal comprises a program stored in a memory and executed by a processor, wherein the program dynamically controls the priority of the presentation of the at least one multimedia presentation and the at least one other multimedia presentation on the second user terminal based on a profile of the second user terminal and displays the at least one multimedia presentation or the at least one other multimedia presentation on the second user terminal based on the profile.

16. The system of claim 15, wherein the information transmitted to the at least second user terminal further comprises the at least one multimedia presentation selected by the first user.

17. The system of claim 15, wherein the information transmitted to the at least second user terminal further comprises access data that allows the at least second user terminal to access the at least one multimedia presentation selected by the first user from a memory on the at least second user terminal.

18. The system of claim 15, wherein the program allows the first user to dynamically inhibit the at least second user terminal from receiving the at least one multimedia presentation by issuing a command via the user interface.

19. The system of claim 15, wherein the program allows the first user to dynamically select portions of the at least one multimedia presentation to transmit to the at least second user terminal in response to user commands.

20. The system of claim 15, wherein the program allows the first user to dynamically control the volume levels of the at least one multimedia presentation.

21. The system of claim 15, wherein the program coordinates the presentation of the at least one multimedia presentation by the first user terminal with the presentation of the at least one multimedia presentation on the at least second user terminal by presenting the multimedia presentation on the first and second user terminals simultaneously.

22. The system of claim 15, wherein the program coordinates the presentation of the at least one multimedia presentation by the first user terminal with the presentation of the at least one multimedia presentation on the at least second user terminal by presenting the at least one multimedia presentation on the at least second user terminal at the earliest time after presenting the at least one multimedia presentation on the first user terminal when the at least second user terminal is not busy.

23. The system of claim 15, wherein the program coordinates the presentation of the at least one multimedia presentation by the first user terminal with the presentation of the at least one multimedia presentation on the at least second user terminal by presenting the at least one multimedia presentation on the at least second user terminal at a pre-calculated time.

24. The system of claim 15, wherein the program coordinates the presentation of the continuous media streams on the at least second user terminal with the capturing of the continuous media streams by the first user terminal and the presentation of the at least one multimedia presentation on the at least second user terminal by presenting the captured continuous media streams on the at least second user terminal in the same time relation to the presentation of the at least one multimedia presentation on the first user terminal.

25. The system of claim 15, wherein the program coordinates the presentation of the captured continuous media streams on the at least second user terminal with the capturing of said continuous media streams by the first user terminal and the presentation of the at least one multimedia presentation on the at least second user terminal by presenting the captured continuous media streams on the at least second user terminal at a pre-calculated time.

26. The system of claim 15, wherein the communication interface is a wireless communication interface and the at least second user terminal is a wireless device.

27. A computer readable storage medium containing a set of instructions for performing a method in a system comprising a plurality of users operating a plurality of user terminals, the method comprising:
   communicating one or more mutually informative multimedia presentations and continuous media streams to the plurality of user terminals in response to one or more triggers received from one or more of the plurality of user terminals, wherein the continuous media streams are coordinated with the one or more mutually informative multimedia presentations;
   presenting the one or more mutually informative multimedia presentations and the continuous media streams on each of the plurality of user terminals; and
   processing requests from each of the users of the plurality of user terminals to dynamically control the priority of the presentation of the one or more mutually informative multimedia presentations on their respective user terminals based on a profile of each of their respective user terminals.

28. The computer readable storage medium of claim 27, wherein the set of instructions is remotely located with respect to the plurality of user terminals.

29. The computer readable storage medium of claim 27, wherein the set of instructions is distributed and coordinated among the plurality of user terminals.

30. The computer readable storage medium of claim 27, wherein dynamic control of the mutually informative multimedia presentations on the plurality of user terminals includes coordinating the presentation of the mutually informative multimedia presentations on the plurality of user terminals.

31. The computer readable storage medium of claim 30, wherein coordinating further comprises presenting the mutually informative multimedia presentations simultaneously.

32. The computer readable storage medium of claim 30, wherein coordinating further comprises presenting the mutually informative multimedia presentations on each of the plurality of user terminals at specific times calculated by the application.

* * * * *